(12) United States Patent
Belghoul et al.

(10) Patent No.: US 10,568,091 B2
(45) Date of Patent: Feb. 18, 2020

(54) FLEXIBLE SLOT STRUCTURE FOR CELLULAR COMMUNICATION IN UNLICENSED SPECTRUM

(71) Applicant: Apple Inc., Cupertino, CA (US)

(72) Inventors: Farouk Belghoul, Campbell, CA (US); Christian W. Mucke, Cupertino, CA (US); Awais M. Hussain, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 8 days.

(21) Appl. No.: 15/887,798

(22) Filed: Feb. 2, 2018

(65) Prior Publication Data

US 2018/0227911 A1 Aug. 9, 2018

Related U.S. Application Data

(60) Provisional application No. 62/456,580, filed on Feb. 8, 2017.

(51) Int. Cl.
*H04W 72/04* (2009.01)
*H04W 74/08* (2009.01)
*H04W 72/12* (2009.01)

(52) U.S. Cl.
CPC ... *H04W 72/0446* (2013.01); *H04W 72/1215* (2013.01); *H04W 72/1268* (2013.01);
(Continued)

(58) Field of Classification Search
None
See application file for complete search history.

(56) References Cited

U.S. PATENT DOCUMENTS

2012/0327870 A1* 12/2012 Grandhi ............... H04W 28/06
370/329
2014/0341207 A1 11/2014 Bhushan
(Continued)

OTHER PUBLICATIONS

International Search Report and Written Opinion, Application No. PCT/US2018/017240, dated May 14, 2018, 13 pages.
(Continued)

*Primary Examiner* — Jeffrey M Rutkowski
*Assistant Examiner* — Andre Tacdiran
(74) *Attorney, Agent, or Firm* — Kowert Hood Munyon Rankin and Goetzel PC; Jeffrey C. Hood

(57) ABSTRACT

This disclosure relates to performing cellular communication in unlicensed spectrum using a flexible slot structure. A cellular base station may perform a listen-before-talk procedure, and may transmit a reservation frame when the listen-before-talk procedure is successful. The reservation frame may reserve a wireless medium for a transmit opportunity. Transmission slots may be scheduled for communication with one or more wireless devices during the transmit opportunity. The transmission slots may be selected from multiple possible uplink transmission slot types and multiple possible downlink transmission slot types. Indications of the scheduled transmission slots, including indications of slot types of the scheduled transmission slots, may be provided to the wireless devices. Wireless communication may be performed between the cellular base station and the wireless devices according to the scheduled transmission slots.

20 Claims, 12 Drawing Sheets

(52) U.S. Cl.
CPC ... *H04W 72/1273* (2013.01); *H04W 74/0816* (2013.01); *H04W 72/0453* (2013.01)

(56) References Cited

U.S. PATENT DOCUMENTS

| | | | | |
|---|---|---|---|---|
| 2014/0376369 | A1* | 12/2014 | Zhu | H04W 72/0486 |
| | | | | 370/230 |
| 2016/0174078 | A1 | 6/2016 | Salem et al. | |
| 2016/0174109 | A1* | 6/2016 | Yerramalli | H04W 28/26 |
| | | | | 370/329 |
| 2016/0262188 | A1* | 9/2016 | Zhang | H04J 11/0056 |
| 2016/0345249 | A1 | 11/2016 | Yoo | |
| 2017/0230970 | A1 | 8/2017 | Kim et al. | |
| 2017/0231005 | A1 | 8/2017 | Babaei et al. | |
| 2017/0332396 | A1* | 11/2017 | Liao | H04L 27/2607 |
| 2018/0115991 | A1* | 4/2018 | Yang | H04W 72/14 |
| 2018/0132235 | A1* | 5/2018 | Hosseini | H04L 5/0051 |
| 2018/0199308 | A1* | 7/2018 | Liu | H04L 5/0048 |
| 2018/0220418 | A1* | 8/2018 | Baghel | H04W 72/0446 |
| 2018/0270860 | A1* | 9/2018 | Bhorkar | H04W 72/0406 |
| 2018/0288805 | A1* | 10/2018 | Bhorkar | H04L 5/0048 |
| 2019/0029034 | A1* | 1/2019 | Sun | H04L 1/1861 |
| 2019/0158334 | A1* | 5/2019 | Kim | H04L 5/00 |
| 2019/0246411 | A1* | 8/2019 | Kim | H04W 16/14 |

OTHER PUBLICATIONS

3GPP, 3rd Generation Partnership Project; Technical Specification Group Radio Access Network; Study on Licensed-Assisted Access to Unlicensed Spectrum; (Release 13); R1-153691 (3GPP TR 36.889 V1.0.1 (Jun. 2015)); 87 pages.

* cited by examiner

FLEXIBLE SLOT STRUCTURE FOR CELLULAR COMMUNICATION IN UNLICENSED SPECTRUM

PRIORITY INFORMATION

This application claims priority to U.S. provisional patent application Ser. No. 62/456,580, entitled "Flexible Slot Structure for Cellular Communication in Unlicensed Spectrum," filed Feb. 8, 2017, which is hereby incorporated by reference in its entirety as though fully and completely set forth herein.

FIELD OF THE INVENTION

The present application relates to wireless communications, and more particularly to systems, apparatuses, and methods for performing cellular communication in unlicensed spectrum using a flexible slot structure.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications.

To increase coverage and better serve the increasing demand and range of envisioned uses of wireless communication, in addition to the communication standards mentioned above, there are further wireless communication technologies under development, including fifth generation (5G) new radio (NR) communication. For both existing and developing wireless communication technologies, an increasingly interesting area includes communication performed in unlicensed spectrum. However, the potential coexistence of multiple wireless communication technologies in unlicensed spectrum, among various other factors, requires special consideration to ensure effective operation in such spectrum. Accordingly, improvements in the field are desired.

SUMMARY OF THE INVENTION

Embodiments are presented herein of apparatuses, systems, and methods for cellular communication in unlicensed spectrum in a manner that utilizes a flexible slot structure.

In many instances, unlicensed spectrum may be used for multiple types of wireless communication. Accordingly, various coexistence techniques may be used to help avoid collisions and other inefficient uses of a wireless medium that could arise from different types of wireless communication occurring on the wireless medium at the same time. In view of such coexistence, it may be beneficial for wireless communication techniques that can operate in unlicensed spectrum to be able to flexibly and dynamically adapt to different amounts of wireless medium availability.

Further, for a cell provided by a cellular base station operating as part of a cellular communication system, the number of wireless devices served may vary over time, as may the amounts of uplink and downlink traffic for those wireless devices, whether the cell is deployed in unlicensed spectrum or in licensed spectrum.

Accordingly, the techniques described herein may include providing for the possibility of dynamically selecting the slot structure(s) used between a base station and its served wireless device(s) from among a variety of possible slot types. The slot structures may include multiple uplink slot types and/or multiple downlink slot types, which may allow for greater flexibility in adapting to the communication needs of the wireless devices served by the cell and/or to the relative availability of wireless medium at a given time.

Such techniques could be used by a wireless device performing 5G NR communication in an unlicensed band on a supplementary downlink only carrier, a supplementary downlink/uplink carrier, and/or in a standalone mode, among various possibilities.

Note that the techniques described herein may be implemented in and/or used with a number of different types of devices, including but not limited to base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
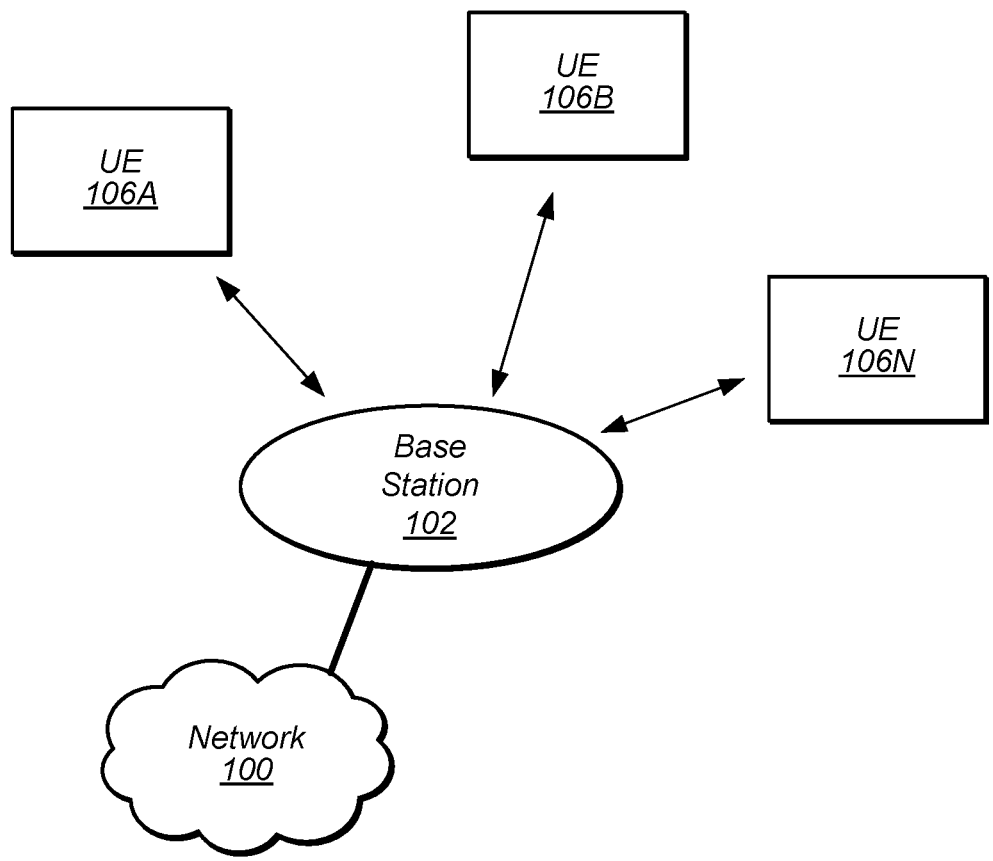
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
LAN: Local Area Network
WLAN: Wireless LAN
LBT: Listen-Before-Talk
AP: Access Point
RAT: Radio Access Technology
IEEE: Institute of Electrical and Electronics Engineers
Wi-Fi: Wireless Local Area Network (WLAN) RAT based on the IEEE 802.11 standards

Terms

The following is a glossary of terms that may appear in the present application:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, e.g. in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
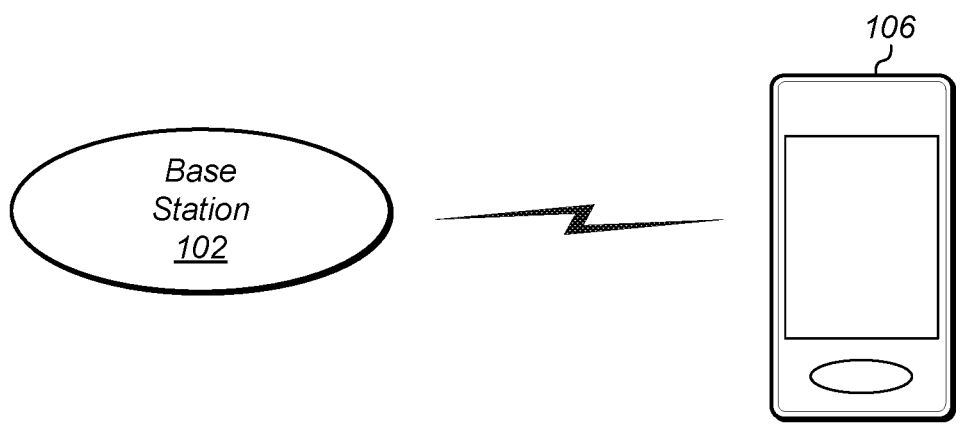
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, WiMAX etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform cellular communication in unlicensed spectrum using a flexible slot structure, at least according to the various methods as described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a handheld device, a wearable device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or GSM), and separate radios for communicating using each of Wi-Fi and BLUETOOTH™. Other configurations are also possible.

Figure 3:
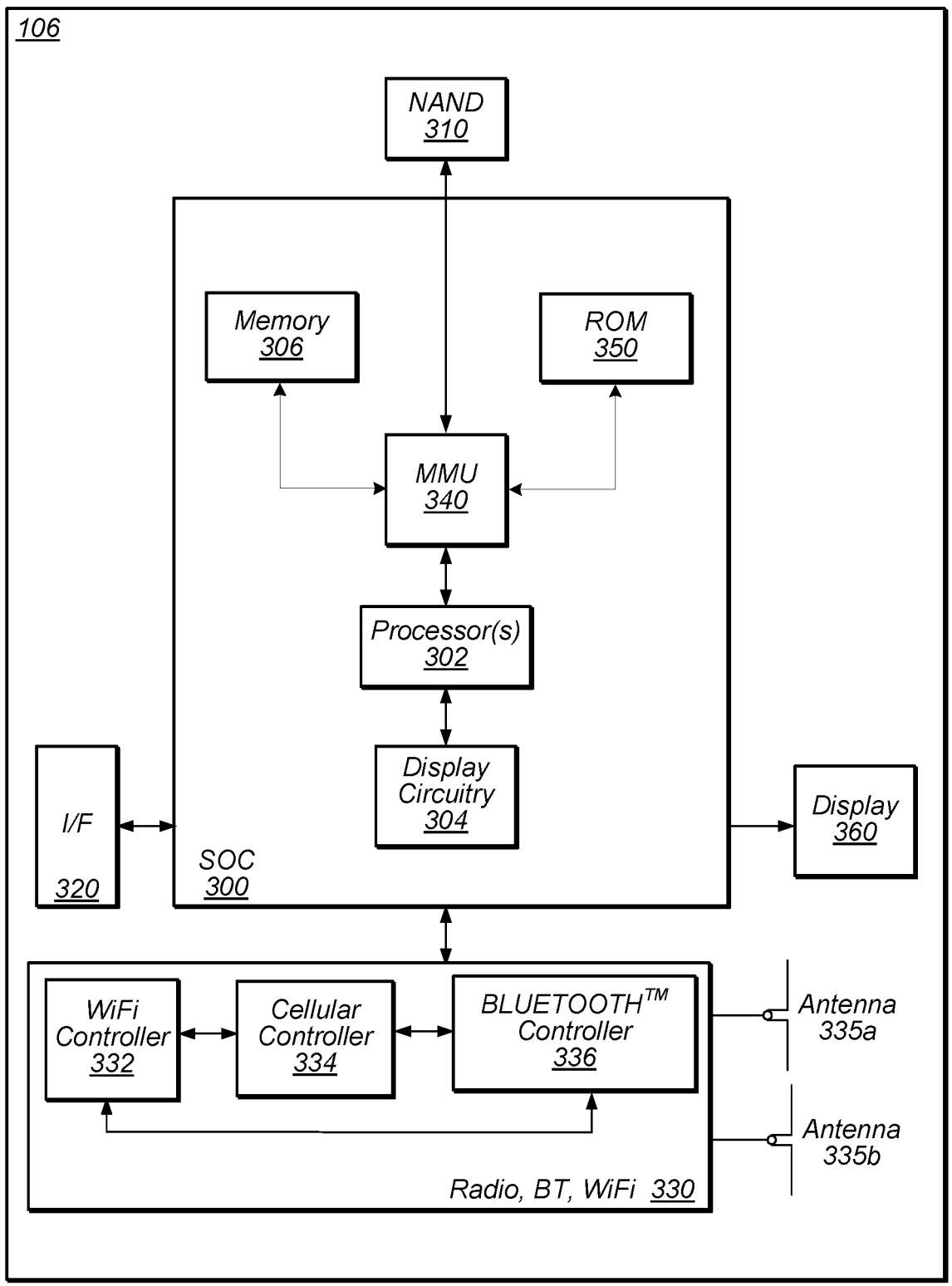
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry 330 (e.g., for LTE, LTE-A, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

As described further subsequently herein, the UE 106 (and/or base station 102) may include hardware and software components for implementing methods for at least UE 106 to perform cellular communication in unlicensed spectrum using a flexible slot structure. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform cellular communication in unlicensed spectrum using a flexible slot structure according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 332, a cellular controller (e.g. NR controller) 334, and BLUETOOTH™ controller 336, and in at least some embodiments, one or more or all of these controllers may be implemented as respective integrated circuits (ICs or chips, for short) in communication with each other and with SOC 300 (and more specifically with processor(s) 302). For example, Wi-Fi controller 332 may communicate with cellular controller 334 over a cell-ISM link or WCI interface, and/or BLUETOOTH™ controller 336 may communicate with cellular controller 334 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 334 may, in addition to hardware and/or software components for performing cellular communication, include hardware and/or software components for performing Wi-Fi preamble detection, e.g., for detecting Wi-Fi physical layer preambles transmitted in unlicensed frequency bands that might be relevant to possible communication in unlicensed spectrum by the UE 106. As another possibility, the cellular controller 334 may include hardware and/or software components for generating Wi-Fi physical layer preamble signals, e.g., for transmitting as part of uplink communications by the UE 106 that occur in unlicensed frequency bands.

Figure 4:
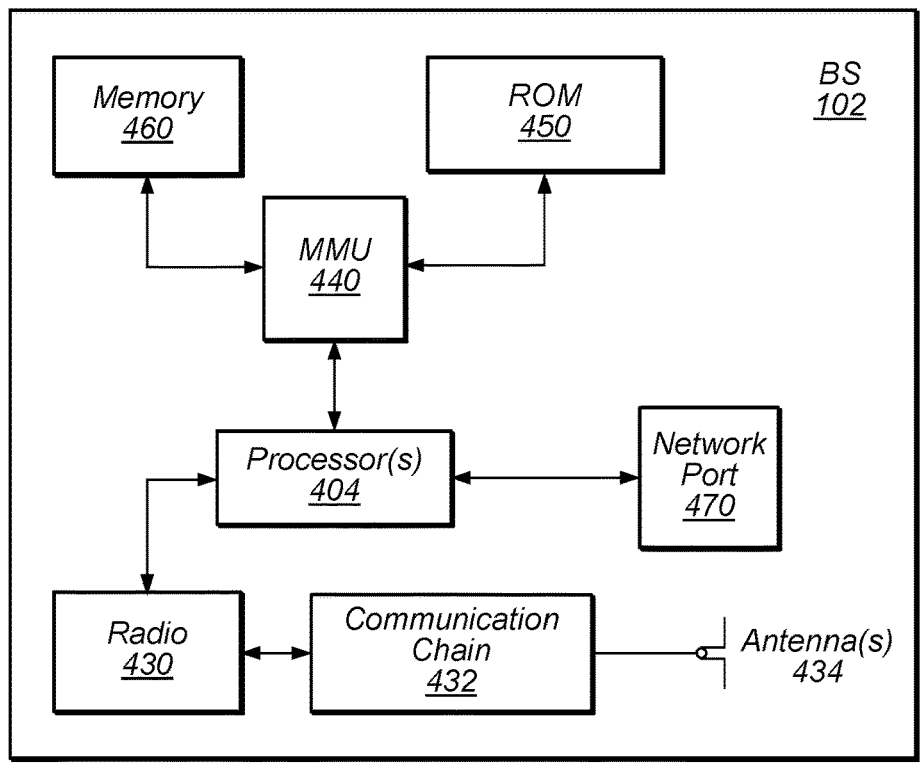
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. The base station 102 may operate according to the various methods as disclosed herein for wireless devices to perform cellular communication in unlicensed spectrum using a flexible slot structure.

Figure 5:
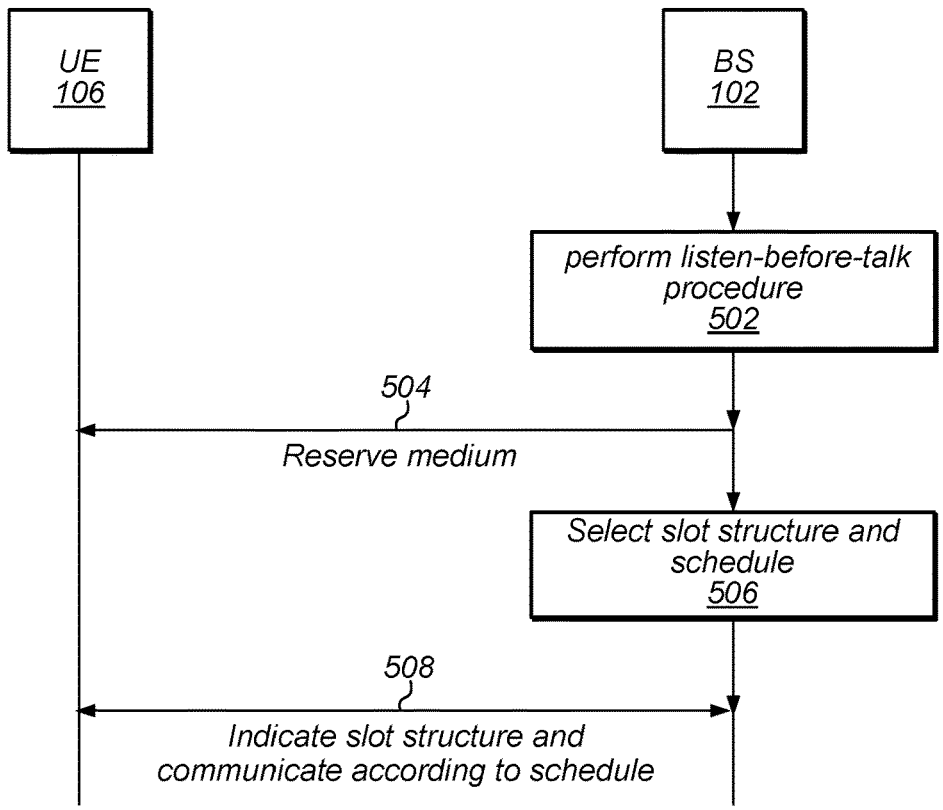
FIG. 5 is a communication flow diagram illustrating aspects of an exemplary possible method for performing cellular communication in unlicensed spectrum using a flexible slot structure, according to some embodiments.

FIG. 5—Cellular Communication in Unlicensed Spectrum Using Flexible Slot Structure FIG. 5 is a flowchart diagram illustrating a method for a wireless device (e.g., a cellular base station or wireless user equipment (UE) device) to perform cellular communication in unlicensed spectrum using a flexible slot structure, according to some embodiments.

Aspects of the method of FIG. 5 may be implemented by a wireless device and a cellular base station, such as a UE 106 and a BS 102 illustrated in and described with respect to various of the Figures herein, or more generally in conjunction with any of the computer systems or devices shown in the above Figures, among other devices, as desired. Note that while at least some elements of the method of FIG. 5 are described in a manner relating to the use of communication techniques and/or features associated with NR and/or 3GPP specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

In 502, the BS 102 may perform a listen-before-talk (LBT) procedure, e.g., to determine whether the wireless medium is available. The BS 102 may be performing the LBT procedure to ensure the wireless medium is available for cellular communication between the BS 102 and one or more wireless devices (e.g., including UE 106) served by the base station, according to some embodiments.

The LBT procedure may operate in a similar manner as illustrated and described subsequently herein with respect to FIG. 14, as one possibility, or in another manner, as desired. The LBT procedure may include monitoring the wireless medium to determine if any transmissions are already ongoing, for example by detecting signal strength levels on the wireless medium above a certain threshold and thus considered to be indicative of an ongoing transmission, by detecting cyclic signal patterns associated with preamble/prefix signals intended to indicate the presence of a transmission, and/or other by performing other transmission detection techniques. For example, according to some embodiments, the LBT procedure may include performing energy detection and Wi-Fi physical layer preamble detection on the wireless medium.

The LBT procedure may further include refraining from transmitting if a transmission is determined to already be in progress, and may be used to help reduce the number of collision occurrences on the wireless medium. For example, if a Wi-Fi physical layer (PHY) preamble is detected during the LBT procedure, the BS 102 may suspend the LBT procedure (and potentially enter a reduced power state, at least with respect to some device components) for a duration indicated by the detected Wi-Fi PHY preamble, e.g., based on detecting the Wi-Fi PHY preamble. According to some embodiments, the LBT procedure may require the wireless medium to be clear for at least a minimum length of time before being considered successful.

In 504, once the LBT procedure is successful, the BS 102 may reserve the wireless medium for a certain length of time, which may be referred to as a transmit opportunity (TXOP). In order to reserve the wireless medium, the BS 102 may transmit a reservation signal, such as a Wi-Fi preamble, which may indicate the length of the TXOP being reserved by the BS 102. The UE 106, as well as any other wireless devices being served by the BS 102 and/or other wireless devices sharing the wireless medium, may receive the indication that the BS 102 is reserving the wireless medium for the TXOP. This may prevent any devices sharing the medium from attempting to transmit during the reserved TXOP (e.g., except in response to being scheduled to utilize a portion of the TXOP by the BS 102), which could result in a collision and interference to the BS 102 and/or the wireless devices served by the BS 102.

In 506, the BS 102 may select the slot structure and schedule for the TXOP. This may include scheduling (e.g., uplink and/or downlink) transmission slots for communication with one or more wireless devices (e.g., including UE 106) during the TXOP. The uplink/downlink transmission slots may be selected from multiple possible uplink transmission slot types and multiple possible downlink transmission slot types, at least according to some embodiments. For example, the multiple possible uplink transmission slot types may include a unidirectional uplink transmission slot and a bidirectional uplink transmission slot, while the multiple possible downlink transmission slot types may include a unidirectional downlink transmission slot and a bidirectional downlink transmission slot, as one possibility. According to some embodiments, each slot may include 7 orthogonal frequency division multiplexing (OFDM) symbols, and a ½ symbol switching gap may occur between uplink and downlink symbols (e.g., for bidirectional transmission slot types and/or between uplink and downlink transmission slots). Other types and configurations of transmission slots are also possible.

The uplink and downlink transmission slot types may be dynamically selected by the BS 102 from the multiple possible uplink transmission slot types and the multiple possible downlink transmission slot types for any of a variety of possible reasons. Having flexibility in slot types to choose from may allow the BS 102 to schedule transmission slots of the TXOP in an efficient manner, for example in view of the remaining duration of the TXOP, how much downlink data is buffered at the base station for each wireless device served by the base station, how much uplink data is buffered at each wireless device served by the base station (e.g., which may be known by the BS 102 based on buffer status reports received from these wireless devices), and/or any of various other possible considerations.

In 508, the BS 102 may provide indications of the scheduled uplink/downlink transmission slots to the wireless device(s) (e.g., including UE 106) with which the uplink/downlink transmission slots are scheduled. These indications may include indications of the transmission slot type(s) scheduled. For example, the BS 102 may provide downlink control information in a bidirectional or unidirectional downlink slot or in a bidirectional uplink slot, that may include the scheduling information. In at least some instances, for unidirectional downlink and uplink slots, the downlink control information scheduling those slots may be provided in a previous slot (e.g., a bidirectional uplink slot or an earlier unidirectional downlink slot). Additionally, in at least some instances, for unidirectional transmission slots, an indication of when hybrid automatic repeat request (HARM) acknowledgement transmission is scheduled may be provided in a previous slot.

The BS 102 and the UE 106 (as well as the BS 102 and one or more other wireless devices served by the BS 102, potentially) may perform wireless communication according to the scheduled uplink and/or downlink transmission slots. For uplink communication symbols, the UE 106 may perform a short LBT procedure prior to transmission (e.g., utilizing the ½ symbol switching gap to provide sufficient time for the LBT procedure), when the uplink symbol is within the TXOP already reserved by the BS 102. Note however that in some circumstances, it may also be possible that a scheduled uplink transmission symbol (or entire slot or multiple slots) can extend beyond the TXOP. In such a case, the UE 106 may perform a full LBT procedure and transmit a reservation frame (e.g., a Wi-Fi preamble) reserving the wireless medium for the duration of the uplink transmission scheduled by the BS 102 after the LBT procedure is successful.

Note that the bandwidth of the wireless medium may be scheduled, and wireless communication may be performed according to the scheduling, such that transmission is performed on at least a portion of each megahertz of the bandwidth of the wireless medium for the duration of the TXOP. Ensuring that the entire carrier bandwidth is spanned by transmissions for the full duration of the TXOP in this manner may help ensure the detectability of the medium usage by the BS 102 and its served wireless devices, thus potentially further helping prevent possible collisions and interference.

Additional Information

FIGS. 6-14 and the following information are provided as being illustrative of further considerations and possible implementation details relating to the method of FIG. 5, and are not intended to be limiting to the disclosure as a whole. Numerous variations and alternatives to the details provided herein below are possible and should be considered within the scope of the disclosure.

Figure 6:
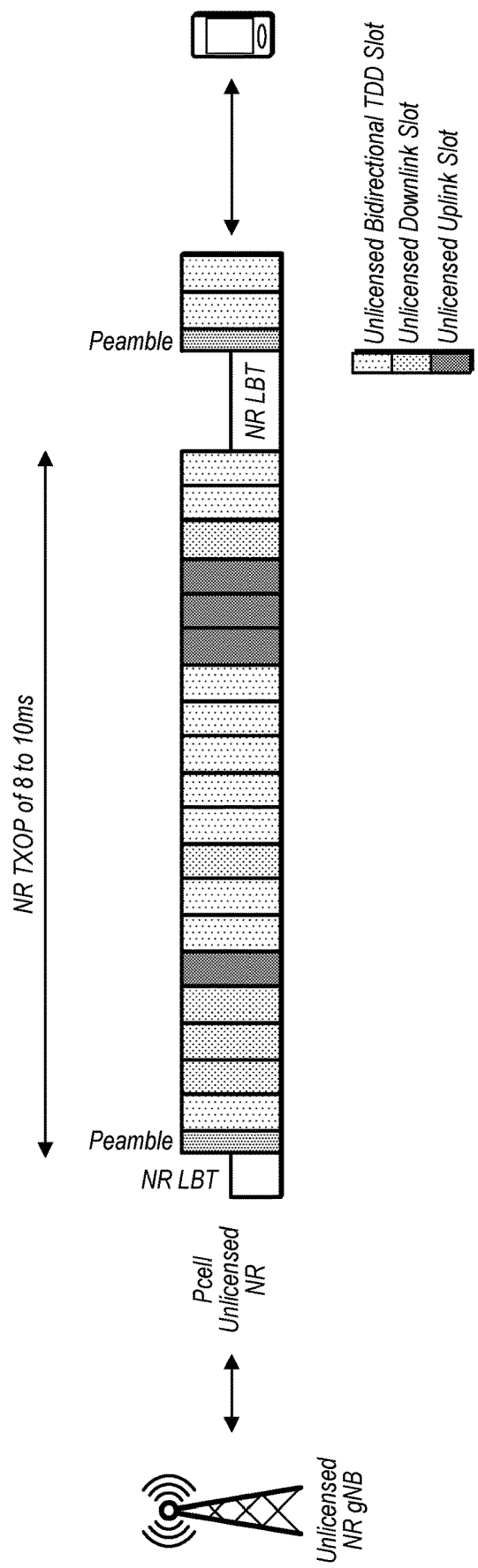
FIGS. 6-8 illustrate exemplary possible 5G NR deployment scenarios in unlicensed spectrum, according to some embodiments.
Figure 7:
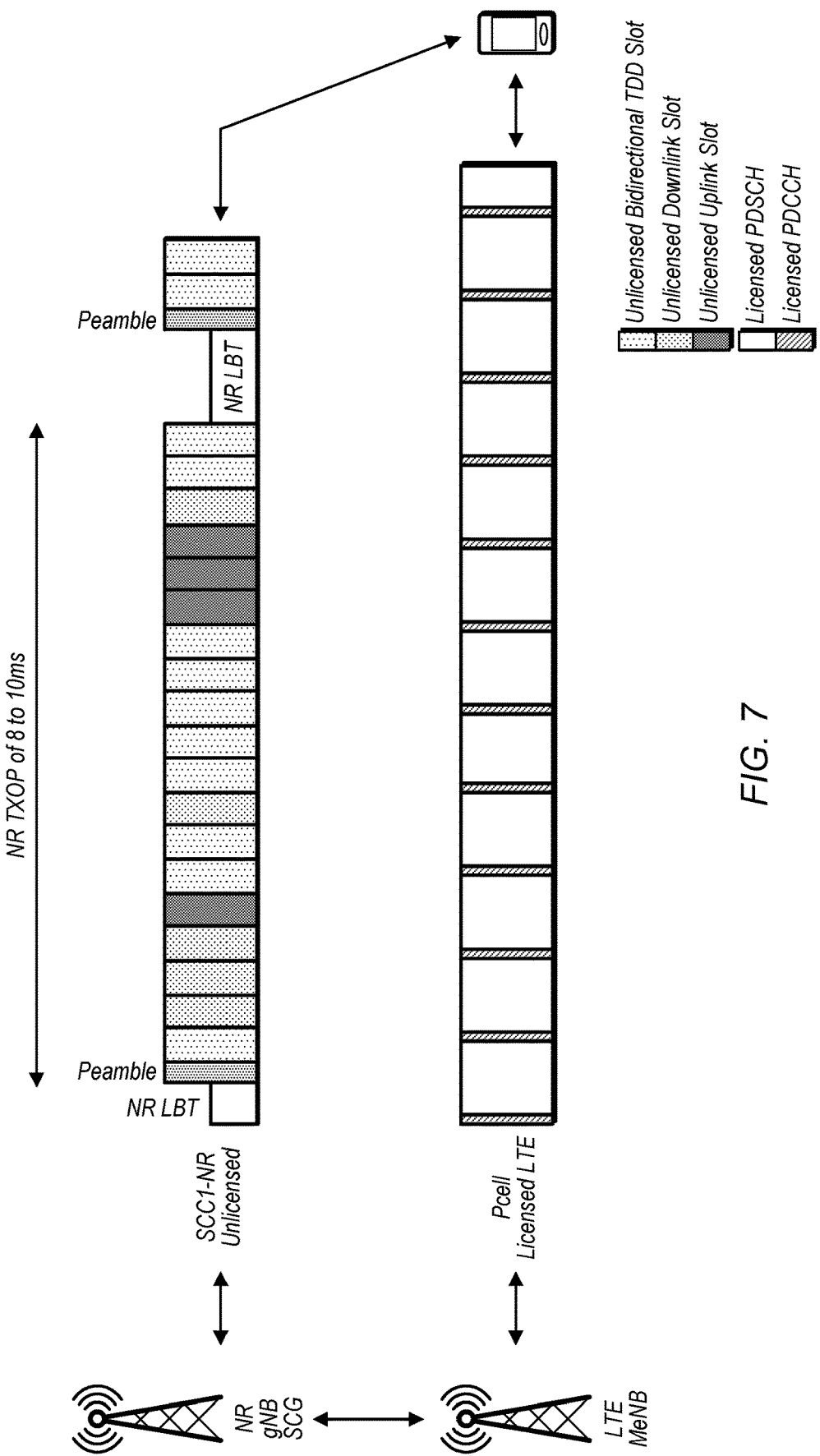
Figure 8:
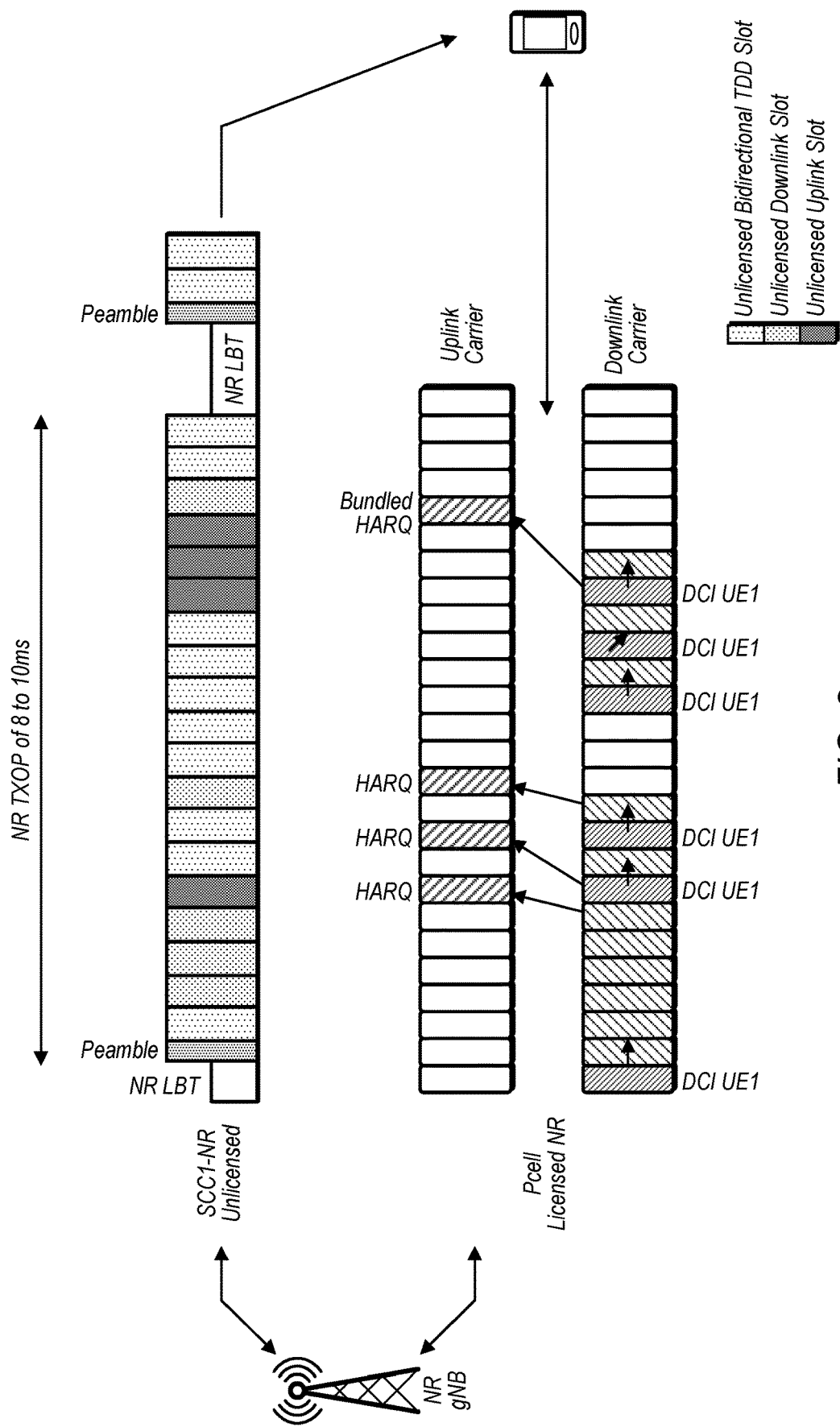

FIGS. 6-8—Example Deployment Scenarios

FIGS. 6-8 illustrate exemplary possible deployment scenarios in which an unlicensed NR carrier could be deployed, according to some embodiments.

As shown, FIG. 6 illustrates a possible standalone deployment. In this example, a cellular base station may provide a standalone 5G NR carrier in unlicensed bandwidth. To provide service, the base station (which may be referred to as a gNB in the 5G NR context) may perform NR LBT procedure, and, upon successful LBT, transmit a preamble reserving the carrier for a transmit opportunity of some length of time (e.g., 8 to 10 ms, or any of various other possible values). The gNB may then schedule any desired combination of uplink, downlink, and/or bidirectional slots over the course of the TXOP, and perform wireless communication with any wireless devices served by the gNB according to that schedule. Note that the slot duration may depend on the subcarrier spacing, which may also be selected by the gNB. For example, for 15 KHz subcarrier spacing, slots may have 0.5 ms duration, while for 30 KHz subcarrier spacing, slots may have 0.25 ms duration, and for 60 KHz subcarrier spacing, slots may have 0.125 ms duration, as one possibility.

FIG. 7 illustrates a possible dual connectivity deployment in which the 5G NR unlicensed carrier is deployed alongside an LTE licensed carrier, e.g., as a secondary carrier for supplemental connectivity. Note that in this scenario the carriers may be operated in a coordinated manner or with limited or even no coordination or synchronization (e.g., no cross carrier scheduling may be used, no time synchronization may be necessary, different subcarrier spacing and slot durations may be used, etc.) between them, as desired.

FIG. 8 illustrates a possible NR/NR unlicensed carrier aggregation deployment in which the 5G NR unlicensed carrier is deployed as a secondary carrier to a licensed NR carrier. In this case the carriers may be operated with or without coordination or synchronization between them. Note, however, that there may be benefits to operating the carriers in a time synchronized manner and with the same slot durations, e.g., in order to allow cross carrier scheduling, among various possibilities, as desired.

FIGS. 9-12—Example 5G NR Unlicensed Communication Timelines

FIGS. 9-12 illustrate various possible communication timelines for an example 5G NR unlicensed communication system, according to some embodiments.

Figure 9:
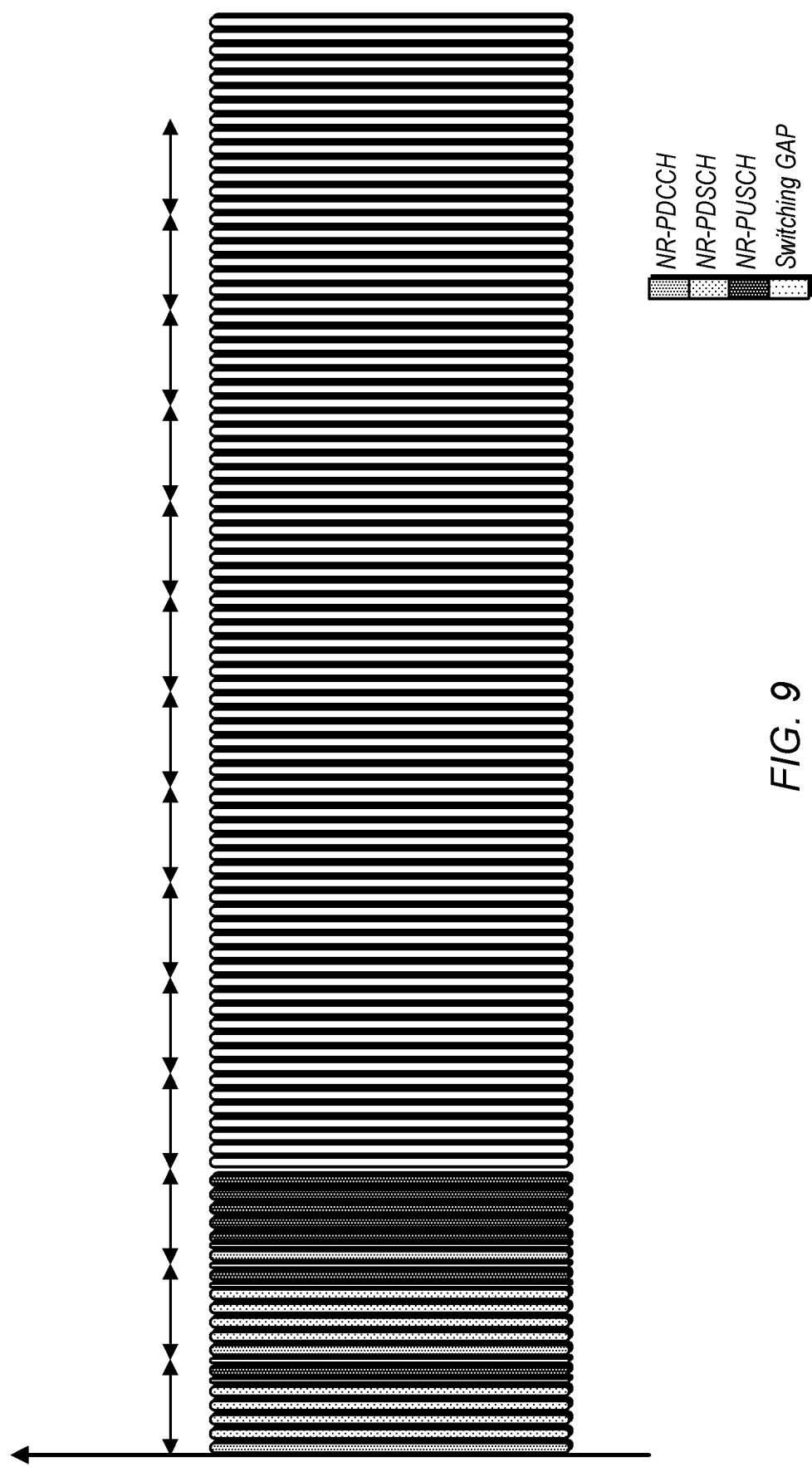
FIGS. 9-12 illustrate exemplary possible 5G NR timelines for communication in unlicensed spectrum, according to some embodiments.

FIG. 9 illustrates a communication timeline in which the first three slots of a TXOP are scheduled as two bidirectional downlink slots and one bidirectional uplink slot. Each of the subsequent (as yet unscheduled) slots may be scheduled dynamically, e.g., depending on any of a variety of considerations, to best meet the needs of the network and user devices in the communication system. According to some embodiments, each slot scheduled may be selected from several unlicensed slot type variants, including the bidirectional uplink and downlink slot types shown in FIG. 9 and/or unidirectional uplink and downlink slot types.

According to some embodiments, the downlink bidirectional slot format may include both downlink data and the uplink HARQ ACK/NACK for the downlink data within a single slot. The uplink bidirectional slot format may include both uplink data and potentially downlink HARQ ACK/NACK (e.g., for previous uplink data) within a single slot. The downlink unidirectional slot format may include downlink data and possibly downlink HARQ ACK/NACK information for one or more previous slots. Similarly, the uplink unidirectional slot format may include uplink data and possibly uplink HARQ ACK/NACK information for one or more previous slots.

Figure 10:
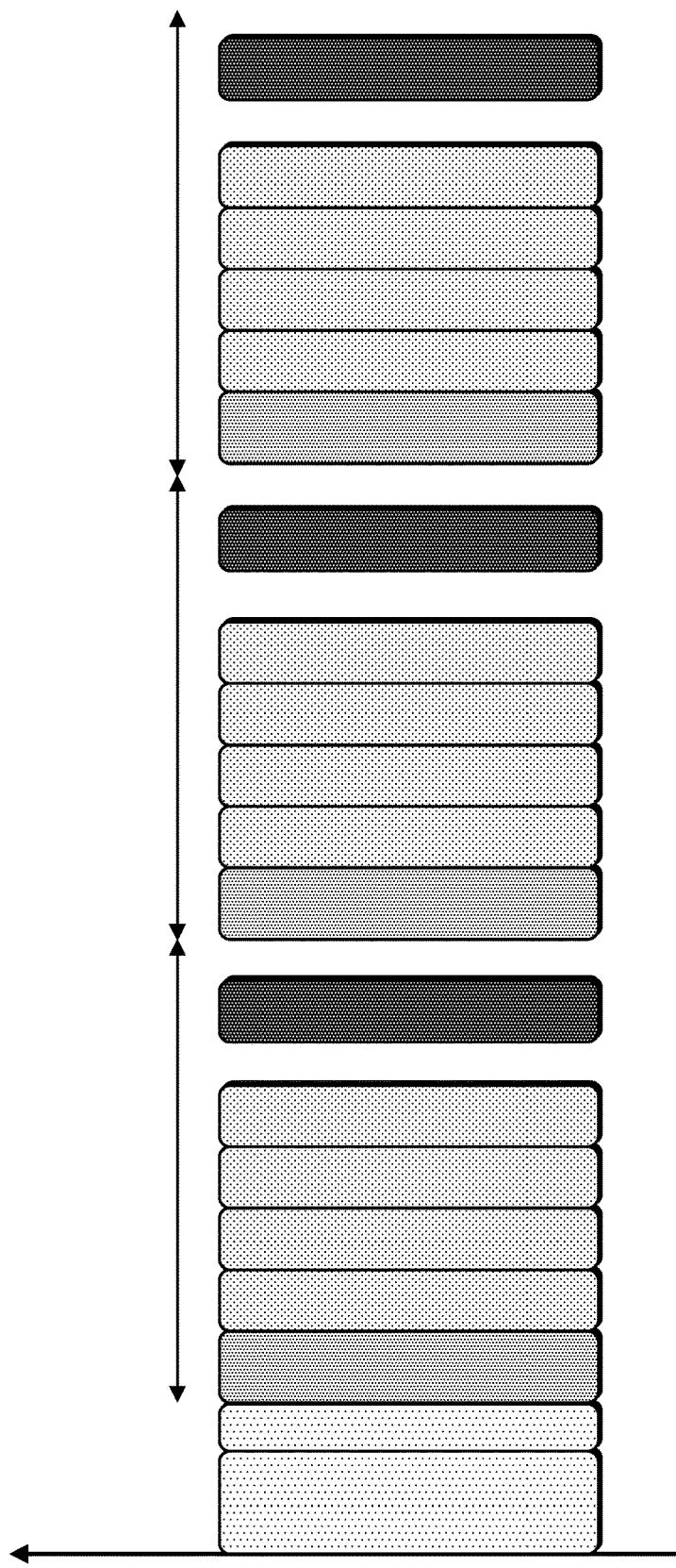

FIG. 10 illustrates the possible downlink bidirectional slot format in more detail, including illustrating LBT procedure and Wi-Fi preamble transmission prior to the downlink bidirectional slots. As shown, the bidirectional downlink slots may include a symbol for the NR-physical downlink control channel (PDCCH) (e.g., including downlink control information indicating the slot format, among other possible information), four symbols for the NR-physical downlink shared channel (PDSCH), and one symbol for the NR-physical uplink shared channel (PUSCH), with a half symbol switching gap between downlink and uplink symbols.

Figure 11:
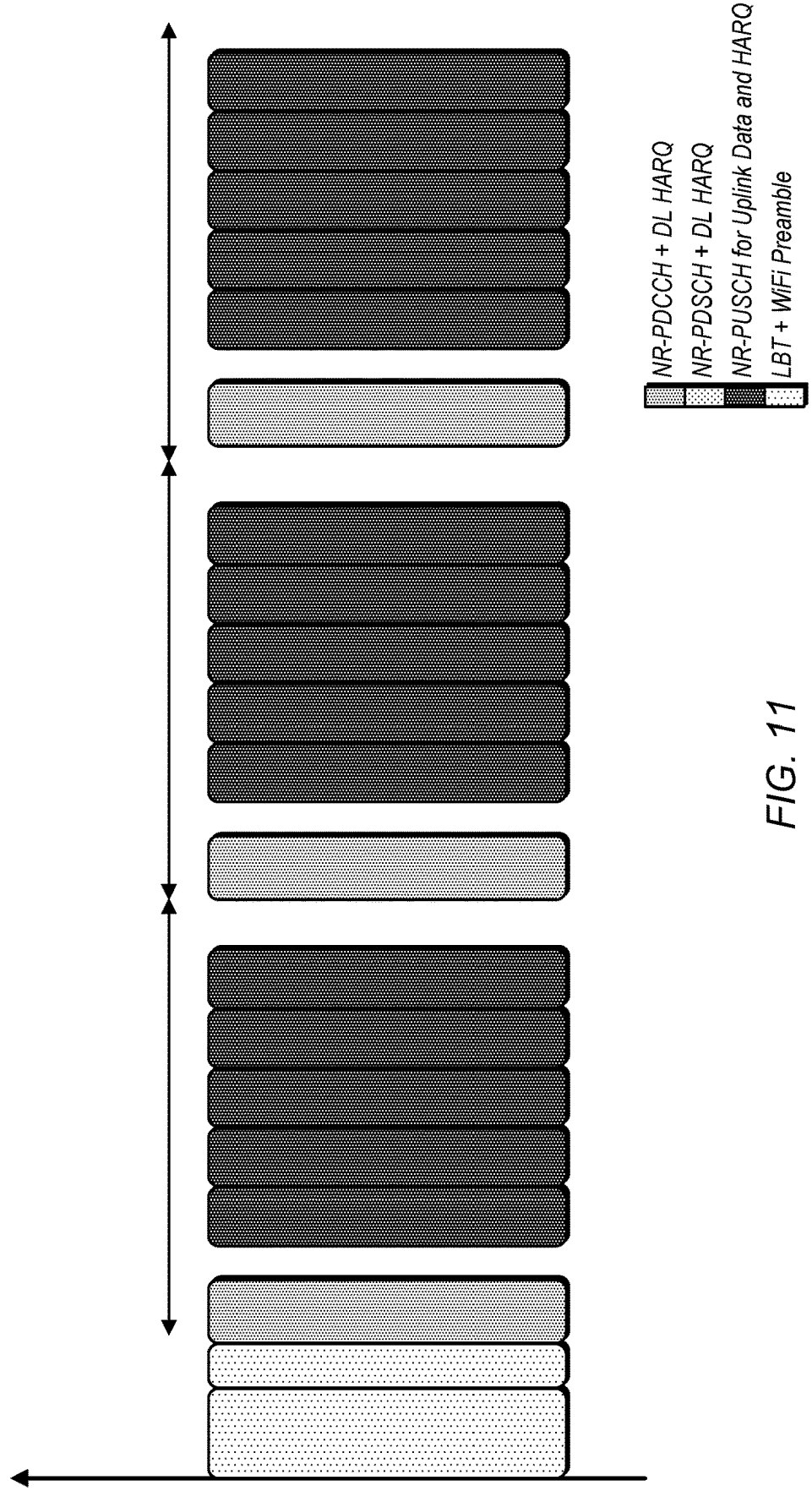

FIG. 11 illustrates the possible uplink bidirectional slot format in more detail, including illustrating LBT procedure and Wi-Fi preamble transmission prior to the uplink bidirectional slots. As shown, the bidirectional uplink slots may include a symbol for the NR-PDCCH (e.g., including downlink control information indicating the slot format, among other possible information), followed by five symbols for the NR-PUSCH, with a half symbol switching gap between downlink and uplink symbols.

Figure 12:
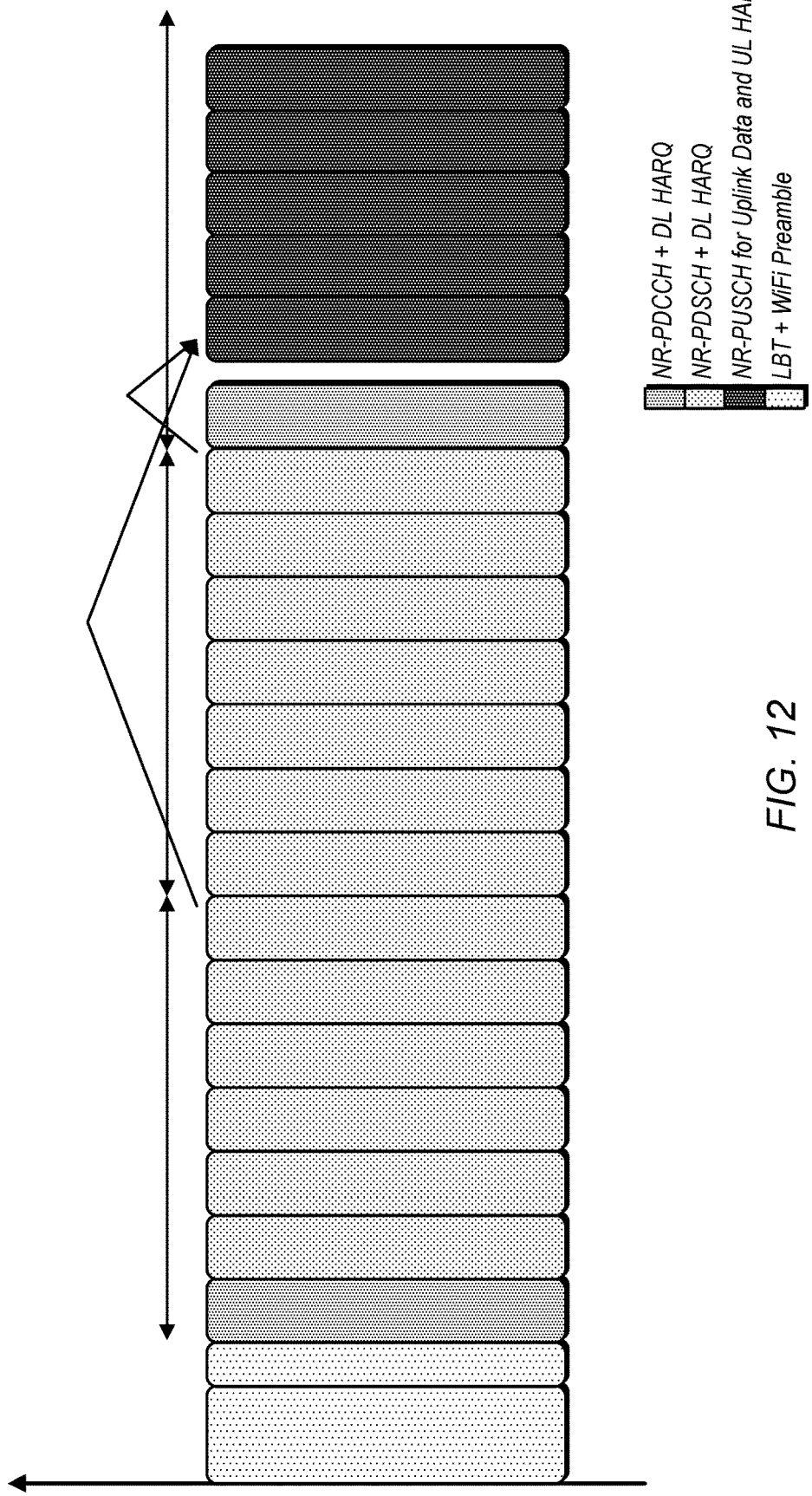

FIG. 12 illustrates the possible downlink unidirectional format in more detail, including illustrating LBT procedure and Wi-Fi preamble transmission prior to the downlink unidirectional slots. As shown, the first unidirectional downlink slot (slot 0) may include a symbol for the NR-PDCCH, which may indicate the slot format, and may also include an indication of how many additional unidirectional downlink slots follow the first unidirectional downlink slot (e.g., one (i.e., slot 1), in the illustrated example) and/or may include an indication of when to transmit HARQ ACK/NACK information for the unidirectional downlink slot(s) (e.g., in the third slot (slot 2), in the illustrated example). The remaining six symbols of the first unidirectional downlink slot as well as all seven symbols of the second unidirectional downlink slot may include the NR-PDCCH. Following the unidirectional downlink slots, at least one bidirectional uplink (e.g., as illustrated) or downlink slot may be scheduled, e.g., in order to provide an opportunity for the recipient wireless device to provide HARQ ACK/NACK information for the downlink data received in the unidirectional downlink slots.

While not illustrated, note that an indication of any slots scheduled to use the uplink unidirectional format may be provided prior to the scheduled uplink unidirectional slot(s), e.g., using a downlink bidirectional or unidirectional slot, or using an uplink bidirectional slot, at least according to some embodiments.

Figure 13:
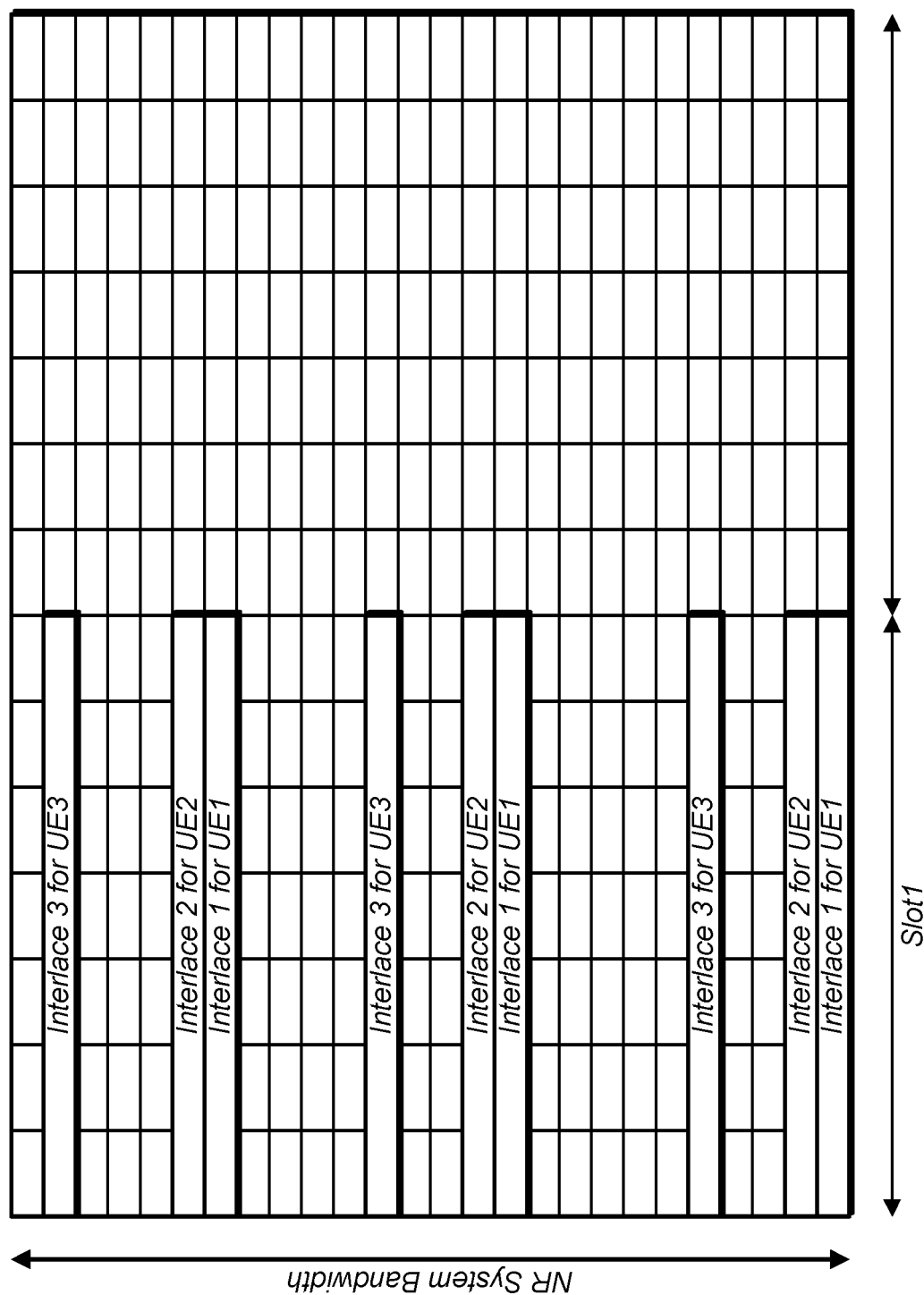
FIG. 13 illustrates an exemplary possible scheduling scheme including interlaced uplink assignments, according to some embodiments.

FIG. 13—Interlaced Uplink Scheduling

In at least some communication systems, regulations and/or good practices may suggest or require certain conditions be met for transmission detectability when operating in unlicensed spectrum. For example, for carriers spanning multiple megahertz, it may be required that during a TXOP there must be signals transmitted on at least a portion of each MHz of the carrier bandwidth. This may, for example, reduce the likelihood that a wireless device monitoring just a portion of the carrier bandwidth could perform a LBT procedure, determine that the medium is free, and initiate a transmission in the that portion of the carrier bandwidth during a reserved TXOP.

To meet this condition, according to some embodiments, a NR gNB may schedule uplink transmissions in such a manner that they span over the entire carrier bandwidth, e.g., including scheduling UEs such that at least one NR-resource block (RB) is occupied in each MHz of the carrier for each slot of the TXOP. This may include scheduling UEs with continuous RB assignments if there are sufficient assignments to be provided in a given slot. Alternatively, this may include scheduling UEs with interlaced RB assignments, as shown in FIG. 13. Such an arrangement may more evenly space the resource assignments throughout the system bandwidth, allowing the gNB to more easily meet the detectability requirement and schedule at least one NR-RB in each MHz of the system bandwidth on occasions when there is relatively little uplink communication to be performed.

Figure 14:
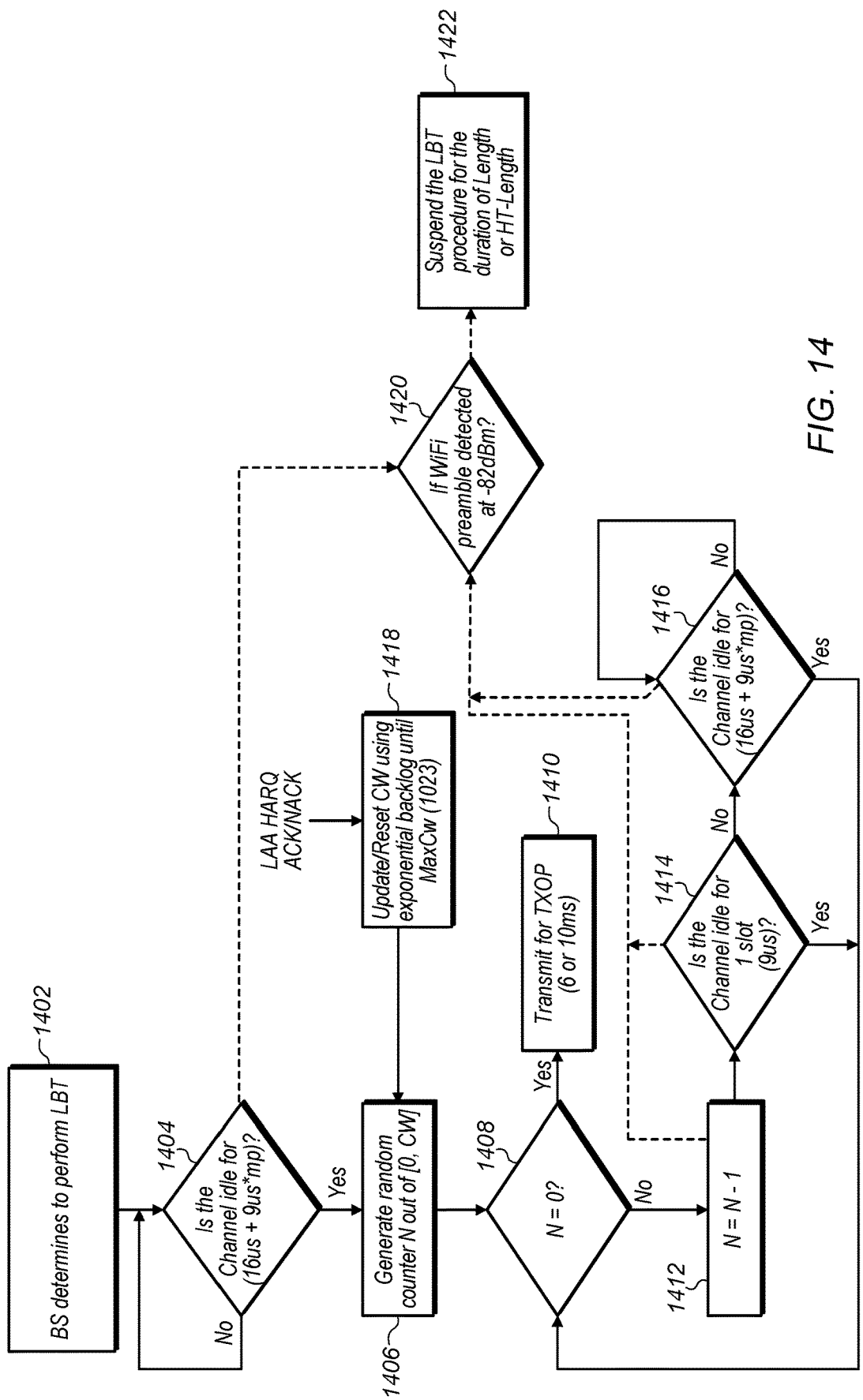
FIG. 14 illustrates an exemplary listen-before-talk procedure, according to some embodiments.

FIG. 14—LBT Procedure with Wi-Fi Preamble Detection Support

FIG. 14 shows an exemplary flowchart for a LBT procedure in which Wi-Fi physical layer preamble detection is supported. Note that while the process shown in FIG. 14 represents one possible LBT procedure, any number of variations on or alternatives to the procedure of FIG. 14 are also possible. For example, while the LBT procedure of FIG. 14 is directed to a base station (e.g., a gNB) performing an LBT procedure, a user equipment device may also or alternatively perform an LBT procedure in certain circumstances. In general, a LBT procedure may be used to help avoid causing collisions on a shared wireless medium, by monitoring the wireless medium to determine if any transmissions are already ongoing, and refraining from transmitting if a transmission is determined to already be in progress.

As shown, in 1402, initially a BS may determine to perform a LBT procedure, e.g., in order to obtain a transmit opportunity.

In 1404, the BS may monitor the wireless medium for availability, to determine whether the channel is idle for a predetermined period of time continuously. The length of time may depend on a type (e.g., priority level) of traffic to be transmitted. For example, different lengths of time may be used for some or all of voice, video, best effort, and background traffic, according to some embodiments. In the exemplary illustrated scenario of FIG. 14, the period of time may include a base length of 16 microseconds plus a variable length of 9 microseconds multiplied by a factor selected based on the traffic type. As an example, the period of time might be 43 µs (e.g., 16+9*3) for best effort traffic, according to some embodiments. Other values (and algorithms for determining values) for the predetermined period of time may also or alternatively be used, as desired.

If the wireless medium is not available for the predetermined period of time continuously (e.g., if the wireless medium is busy or becomes busy before the predetermined period of time expires, as may be detected based on the energy level detected on the wireless medium), the BS may continue to monitor the wireless medium until such a time as the wireless medium does become idle for the predetermined period of time continuously, at which time the method may proceed to step 1406. Alternatively, the method may proceed to step 1420 if the wireless medium is determined to be busy as a result of detection of a Wi-Fi preamble at a sufficient signal strength (e.g., −82 dBm, as shown, or any other desired threshold value). In this case, in 1422, the LBT procedure may be suspended for the duration indicated in the Wi-Fi preamble (e.g., in the length or HT-length subfield of the Wi-Fi preamble), following which the method may return to step 1404 to continue monitoring the wireless medium for availability until such a time as the wireless medium does become idle for the predetermined period of time continuously, at which time the method may similarly proceed to step 1406.

In 1406, the BS may generate a random counter N with a value within a specified contention window (CW) range, e.g., between 0 and a predetermined maximum possible value CW. Note that the method may also proceed to step 1406 to perform a LBT procedure from step 1418, in which the contention window may be updated or reset using an exponential backlog until a maximum contention window size is reached, e.g., based on LAA HARQ ACK/NACK information.

In 1408, it may be determined if the counter N is equal to 0. If yes, the method may proceed to step 1410, in which the BS may proceed to utilize its transmission opportunity (e.g., 6 or 10 milliseconds, among various possibilities). If the counter N is not equal to 0, the method may proceed to step 1412, in which the counter N may be reduced by 1.

In 1414, it may be determined if the wireless medium remains idle for 1 Wi-Fi slot (e.g., 9 µs). If it is determined not to be idle as a result of energy sensing, the method may proceed to step 1416, in which the BS may again monitor the wireless medium for availability (e.g., in a similar manner as in step 1404), to determine whether the channel is idle for the predetermined period of time continuously. The BS may repeat this step as needed until the channel is idle for the predetermined period of time continuously.

Note that if while monitoring the wireless medium during step 1414 and/or step 1416, a Wi-Fi preamble is detected, the method may proceed to step 1420. In this case, in 1422, the LBT procedure may be suspended for the duration indicated in the Wi-Fi preamble, following which the method may return to step 1416 to continue monitoring the wireless medium for availability until such a time as the wireless medium does become idle for the predetermined period of time continuously (i.e., a 'yes' result from step 1416).

If the result of step 1414 or step 1416 is 'yes', the method may return to step 1408, in which it may be determined if the counter N is now equal to 0. As previously noted, once the counter N is equal to 0, the method may proceed to step 1410, in which the BS may proceed to utilize its transmission opportunity. Otherwise, the method may repeat its countdown of the counter N when the wireless medium is idle according to the illustrated procedure.

In the following further exemplary embodiments are provided.

One set of embodiments may include a method, comprising: by a cellular base station: performing a listen-before-talk procedure; transmitting a reservation frame when the listen-before-talk procedure is successful, wherein the reservation frame indicates a length, wherein the reservation frame reserves a wireless medium for a transmit opportunity (TXOP) of the indicated length; scheduling uplink and downlink transmission slots for communication with one or more wireless devices during the TXOP, wherein the uplink and downlink transmission slots are selected from multiple possible uplink transmission slot types and multiple possible downlink transmission slot types; providing indications of the scheduled uplink and downlink transmission slots to the one or more wireless devices for which uplink and/or downlink transmission slots are scheduled, wherein the indications further indicate slot types of the scheduled uplink and downlink transmission slots; and performing wireless communication with the one or more wireless devices according to the scheduled uplink and downlink transmission slots.

According to some embodiments, one possible uplink transmission slot type comprises a unidirectional uplink slot, wherein one possible downlink transmission slot type comprises a unidirectional downlink slot type, wherein the method further comprises: providing an indication of when hybrid automatic repeat request (HARQ) acknowledgement transmission is scheduled for unidirectional uplink slots and for unidirectional downlink slots.

According to some embodiments, the wireless medium reserved by the cellular base station comprises a bandwidth, wherein scheduling the uplink and downlink transmission slots for communication with one or more wireless devices during the TXOP further comprises scheduling transmissions on at least a portion of each megahertz of the bandwidth for the duration of the TXOP.

Another set of embodiments may include a method, comprising: by a wireless device: receiving a reservation frame from a cellular base station, wherein the reservation frame indicates a length, wherein the reservation frame reserves a wireless medium for a transmit opportunity (TXOP) of the indicated length; receiving scheduling information from the cellular base station indicating one or more uplink and/or downlink transmission slots scheduled for communication between the wireless device and the cellular base station during the TXOP, wherein the uplink and/or downlink transmission slots are selected from multiple possible uplink transmission slot types and multiple possible downlink transmission slot types; and performing wireless communication with the cellular base station according to the scheduled uplink and/or downlink transmission slots.

According to some embodiments, the method further comprises: determining whether a scheduled uplink transmission slot extends beyond the TXOP; performing a first listen-before-talk procedure before the scheduled uplink transmission slot when the scheduled uplink transmission slot does not extend beyond the TXOP; performing a second listen-before-talk procedure before the scheduled uplink transmission slot when the scheduled uplink transmission slot does extend beyond the TXOP, wherein the second listen-before-talk procedure comprises a longer listen-before-talk procedure than the first listen-before-talk procedure; and transmitting a reservation frame before the scheduled uplink transmission slot when the scheduled uplink transmission slot does extend beyond the TXOP and when the second listen-before-talk procedure is successful.

According to some embodiments, the uplink and downlink transmission slot types are dynamically selected from the multiple possible uplink transmission slot types and the multiple possible downlink transmission slot types based at least in part on one or more of: a remaining duration of the TXOP; or an amount of uplink and/or downlink data buffered for communication between the cellular base station and each of the one or more wireless devices.

According to some embodiments, the wireless communication is performed according to fifth generation (5G) new radio (NR) cellular communication in unlicensed spectrum, wherein the wireless medium comprises one of: a standalone 5G NR carrier; a 5G NR carrier providing dual connectivity in conjunction with a long term evolution (LTE) carrier operating in licensed spectrum; or a 5G NR carrier provided as a secondary carrier as part of a carrier aggregation scheme in conjunction with a 5G NR carrier operating in licensed spectrum.

According to some embodiments, the multiple possible uplink transmission slot types comprise at least a unidirectional uplink transmission slot and a bidirectional uplink transmission slot, wherein the multiple possible downlink transmission slot types comprise at least a unidirectional downlink transmission slot and a bidirectional downlink transmission slot, wherein each slot comprises 7 orthogonal frequency division multiplexing (OFDM) symbols, wherein a ½ symbol switching gap occurs between uplink and downlink symbols.

According to some embodiments, the reservation frame comprises a Wi-Fi preamble.

A still further exemplary set of embodiments may include an apparatus, comprising a processing element configured to cause a device to implement any or all parts of the preceding examples.

Another exemplary set of embodiments may include a device, comprising: an antenna; a radio coupled to the antenna; and a processing element operably coupled to the radio, wherein the device is configured to implement any or all parts of the preceding examples.

A yet further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus, comprising:
a processor configured to cause a wireless device to:
receive a reservation frame from a cellular base station, wherein the reservation frame indicates a length, wherein the reservation frame reserves a wireless medium for a transmit opportunity (TXOP) of the indicated length;
receive scheduling information from the cellular base station indicating one or more uplink and/or downlink transmission slots scheduled for communication between the wireless device and the cellular base station during the TXOP, wherein transmission slot types of the uplink and/or downlink transmission slots are selected from a plurality of transmission slot types including—unidirectional uplink and downlink and bidirectional uplink and downlink transmission slot types; and
perform wireless communication with the cellular base station according to the scheduled uplink and/or downlink transmission slots, wherein, when the one or more uplink and/or downlink transmission slots comprises an uplink transmission slot, the processor is further configured to cause the wireless device to:
determine whether the uplink transmission slot is within the TXOP; and
select a type of listen-before-talk procedure, from a plurality of possible types of listen-before-talk procedures, to perform prior to the uplink transmission slot, wherein the type of listen-before-talk procedure is selected from the plurality of possible types of listen-before-talk procedures based at least in part on the determination of whether the uplink transmission slot is within the TXOP, wherein a first type of listen-before-talk procedure of the plurality of possible types of listen-before-talk procedures includes a short listen-before-talk procedure performed during a ½ symbol switching gap between uplink and downlink symbols and wherein the plurality of possible types of listen-before-talk procedures further includes a second type of listen-before-talk procedure different from the first type of listen-before-talk procedure.

2. The apparatus of claim 1, wherein the processor is further configured to cause the wireless device to:

transmit a reservation frame before the uplink transmission slot when the uplink transmission slot does extend beyond the TXOP and when the selected type of listen-before-talk procedure is successful.

3. The apparatus of claim 1,
wherein the transmission slot types are dynamically selected based at least in part on one or more of:
a remaining duration of the TXOP; or
an amount of uplink and/or downlink data buffered for communication between the cellular base station and the wireless device.

4. The apparatus of claim 1,
wherein the wireless communication is performed according to fifth generation (5G) new radio (NR) cellular communication in unlicensed spectrum, wherein the wireless medium comprises one of:
a standalone 5G NR carrier;
a 5G NR carrier providing dual connectivity in conjunction with a long term evolution (LTE) carrier operating in licensed spectrum; or
a 5G NR carrier provided as a secondary carrier as part of a carrier aggregation scheme in conjunction with a 5G NR carrier operating in licensed spectrum.

5. The apparatus of claim 1, wherein the first type of listen-before-talk procedure is selected in response to a determination that the uplink transmission slot is within the TXOP.

6. The apparatus of claim 1, wherein the second type of listen-before-talk procedure includes transmitting a reservation frame.

7. A wireless device, comprising:
an antenna;
a radio operably coupled to the antenna; and
a processor operably coupled to the radio;
wherein the antenna, radio, and processor are configured to:
receive a reservation frame from a cellular base station, wherein the reservation frame indicates a length, wherein the reservation frame reserves an unlicensed wireless medium for a transmit opportunity (TXOP) of the indicated length;
receive scheduling information from the cellular base station indicating one or more transmission slots scheduled for communication between the wireless device and the cellular base station during the TXOP, wherein transmission slot types of the transmission slots are selected from a plurality of transmission slot types including—unidirectional uplink and downlink and bidirectional uplink and downlink transmission slot types; and
perform wireless communication with the cellular base station on the unlicensed wireless medium according to the scheduled transmission slots, wherein said performing wireless communication includes, in response to a determination that the one or more transmission slots includes an uplink transmission slot:
determine whether the uplink transmission slot is within the TXOP; and
select a type of listen-before-talk procedure, from a plurality of possible types of listen-before-talk procedures, to perform prior to the uplink transmission slot based at least in part on the determination of whether the uplink transmission slot is within the TXOP, wherein a first type of listen-before-talk procedure of the plurality of possible types of listen-before-talk procedures includes a short listen-before-talk procedure performed during a ½ symbol switching gap between uplink and downlink symbols and wherein the plurality of possible types of listen-before-talk procedures further includes a second type of listen-before-talk procedure different from the first type of listen-before-talk procedure.

8. The wireless device of claim 7, wherein the antenna, radio, and processor are further configured to:
receive an indication of when hybrid automatic repeat request (HARQ) acknowledgement or negative acknowledgement transmission is scheduled for the scheduled transmission slots; and
transmit HARQ acknowledgement or negative acknowledgement information to the cellular base station in accordance with the indication of when HARQ acknowledgement or negative acknowledgement transmission is scheduled for the scheduled transmission slots.

9. The wireless device of claim 7, wherein the antenna, radio, and processor are further configured to:
transmit a reservation frame on the unlicensed wireless medium prior to the uplink transmission slot if the uplink transmission slot extends beyond the TXOP.

10. The wireless device of claim 9,
wherein the wireless communication comprises fifth generation (5G) new radio (NR) communication,
wherein the reservation frame comprises a Wi-Fi preamble.

11. The wireless device of claim 7, wherein the first type of listen-before-talk procedure is selected in response to a determination that the uplink transmission slot is within the TXOP.

12. The wireless device of claim 11, wherein a second type of listen-before-talk procedure includes a full listen-before-talk procedure, wherein the second type of listen-before-talk procedure is selected in response to a determination that the uplink transmission slot extends beyond the TXOP.

13. The wireless device of claim 12, wherein the second type of listen-before-talk procedure includes transmitting a reservation frame.

14. The wireless device of claim 13, wherein the reservation frame is a Wi-Fi preamble.

15. A method for operating a wireless device, the method comprising:
at the wireless device:
receiving a reservation frame from a cellular base station, wherein the reservation frame indicates a length, wherein the reservation frame reserves a wireless medium for a transmit opportunity (TXOP) of the indicated length;
receiving scheduling information from the cellular base station indicating one or more uplink and/or downlink transmission slots scheduled for communication between the wireless device and the cellular base station during the TXOP, wherein transmission slot types of the uplink and/or downlink transmission slots are selected from a plurality of transmission slot types including—unidirectional uplink and downlink and bidirectional uplink and downlink transmission slot types; and
performing wireless communication with the cellular base station according to the scheduled uplink and/or downlink transmission slots, wherein, when the one or more uplink and/or downlink transmission slots comprises an uplink transmission slot, the method further comprises:

determining whether the uplink transmission slot is within the TXOP; and selecting a type of listen-before-talk procedure, from a plurality of possible types of listen-before-talk procedures, to perform prior to the uplink transmission slot, wherein the type of listen-before-talk procedure is selected from the plurality of possible types of listen-before-talk procedures based at least in part on the determination of whether the uplink transmission slot is within the TXOP, wherein a first type of listen-before-talk procedure of the plurality of possible types of listen-before-talk procedures includes a short listen-before-talk procedure performed during a ½ symbol switching gap between uplink and downlink symbols and wherein the plurality of possible types of listen-before-talk procedures further includes a second type of listen-before-talk procedure different from the first type of listen-before-talk procedure.

16. The method of claim 15, wherein selecting the type of listen-before-talk procedure comprises selecting the first type of listen-before-talk procedure in response to a determination that the uplink transmission slot is within the TXOP.

17. The method of claim 15, wherein selecting the type of listen-before-talk procedure comprises selecting the second type of listen-before-talk procedure in response to a determination that the uplink transmission slot extends beyond the TXOP.

18. The method of claim 15, wherein the second type of listen-before-talk procedure includes transmitting a reservation frame.

19. The method of claim 15, wherein the second type of listen-before-talk procedure includes transmitting a Wi-Fi preamble.

20. The method of claim 15, wherein the wireless medium comprises one of:
- a standalone 5G NR carrier;
- a 5G NR carrier providing dual connectivity in conjunction with a long term evolution (LTE) carrier operating in licensed spectrum; or
- a 5G NR carrier provided as a secondary carrier as part of a carrier aggregation scheme in conjunction with a 5G NR carrier operating in licensed spectrum.

* * * * *